July 17, 1956  H. H. HOLLIS  2,754,741
SIDE ARM TRACTOR ATTACHMENT
Filed Nov. 10, 1950  2 Sheets-Sheet 1

INVENTOR.
HOMER H. HOLLIS
BY
Attorney

July 17, 1956  H. H. HOLLIS  2,754,741
SIDE ARM TRACTOR ATTACHMENT
Filed Nov. 10, 1950  2 Sheets-Sheet 2

INVENTOR.
HOMER H. HOLLIS
BY
Attorney

United States Patent Office 2,754,741
Patented July 17, 1956

2,754,741

SIDE ARM TRACTOR ATTACHMENT

Homer H. Hollis, Lillie, La.

Application November 10, 1950, Serial No. 195,029

1 Claim. (Cl. 97—47.37)

My invention relates to tractor attachments generally, but more in particular to a tractor plow and frame therefor, the frame being mounted on the tractor in such a position as to permit the plow discs to be extended outwardly and forwardly at an angle between a front and rear wheel of the tractor. The invention further pertains to a gang disc plow particularly adaptable to orchard plowing wherein the extended discs are easily maneuverable around trees.

The greatest objection to plows of this type as shown in the prior art has been the inability of the operator to see the plows in operation so that a ready adjustment can be made when necessary. In former devices of this type the plows are positioned either at the front or the rear of the tractor rather than at the side. If the tractor is arranged to push the set of plows, the operator is unable to see the actual plowing because the engine of his tractor is in the line of sight. If the tractor is arranged to pull the plows, the operator is required to look backward and attempt to observe the plowing and adjust the depth, angle, etc. A few of the prior art arrangements disclose devices having the set of plows extended between a front and rear wheel of the tractor and positioned at an approximate right angle to the axial line of the tractor. Since the thrust against the plows is heavy, it was necessary to arrange a similar assembly on the opposite side of the tractor in an effort to balance the loads. It is readily apparent that such an arrangement cannot be used with success in plowing a fruit orchard where the tractor must be made to weave in and out and disc the ground as close as possible to the fruit trees.

It is desirable that such a plow be positioned where the actual work of the set of discs is in sight of an operator at all times so that the depth of plowing may be readily controlled and whereby the operator may have a clear view of every movement and thus prevent accidental injury to the trees. It is further desirable in an orchard plow of the present type that the plow be easily attached and removed from the tractor and, if possible, permit other attachments to be substituted for the orchard plow without the necessity of considerable rearrangement of parts.

It is an object, therefore, of the present invention to provide an orchard plow and a frame therefor, the frame being adapted for mounting on a tractor in such a manner as to permit the plow to extend outwardly and forwardly between a front and rear wheel of the tractor where the work of the plow is in clear view by the tractor operator at all times.

It is another object of the invention to provide an orchard plow construction as above mentioned wherein the resultant thrust load from the plows is concentrated at the rear of the tractor and at such an angle to the line of movement of the tractor as to prevent the tractor from being pulled to one side or otherwise turned from a direction as set by the operator.

A further object of the invention is to provide a general frame structure wherein the present invention in an orchard plow may be removed and substituted by other plows or attachments without the removal of the general frame from the tractor.

Another object of the invention is to provide a means of extending the disc plows at any desired distance outwardly from the tractor and setting the same at any angle within a 45 degree movement with respect to the line of movement of the tractor.

Another object of the invention is to provide a general frame for supporting the orchard plow and wherein the hydraulic lifting mechanism of the tractor is utilized to raise or lower the frame to set the depth of the plow discs.

A further object of the invention is to provide an orchard plow and frame therefor which is inexpensive to manufacture and wherein the frame may be left mounted to the tractor without interfering with any other tools or attachments and permitting the tractor to be used for any other operation after the plow itself has been removed.

Further objects and advantages of the invention will become apparent in the course of the following detailed description when viewed together with the accompanying drawing in which.

Figure 1:
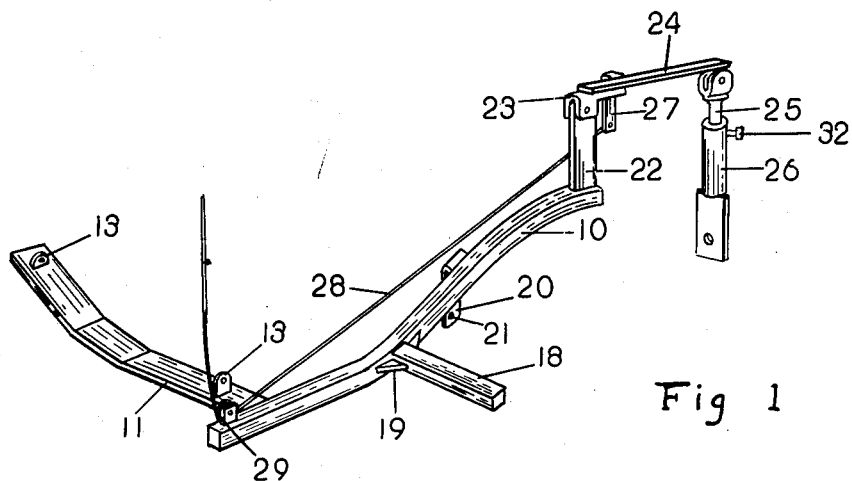
Fig. 1 is an isometric view of the sub-structure or main frame of my invention, the same being shown removed from the tractor.
Figure 2:
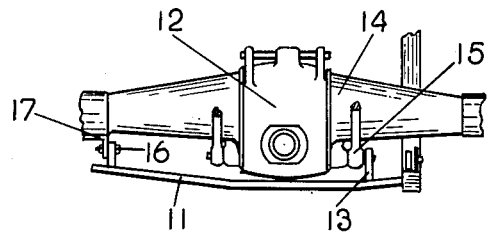
Fig. 2 is a broken view taken from the rear end of a tractor and showing the mode of mounting the main frame to the axle housing of the tractor.

In Fig. 1 of the drawing, I have shown the main framework of the plow attachment as consisting of a side arm 10 bent more or less in an S-curve as shown. In the present instance, the side arm 10 is made of a length of square tubing of a size sufficient to withstand any normal thrusts produced by the set of plows as will be described later. At the rear end of the arm 10 I have provided a cross bar 11 made of a steel plate having one of its ends welded to the side arm 10. The mid-portion of this cross bar 11 is bent slightly to provide clearance for the tractor differential housing 12 as shown in Fig. 2. On the rear cross bar 11 I have provided a pair of uprights or standards 13, each provided with a mounting hole. As shown in Fig. 2 the cross bar 11 is swung beneath the tractor's rear axle housing 14 by placing the hole of the inner standard 13 over the existing pin provided in the tractor's hydraulic lifting mechanism 15 and the other being held by a bolt 16 extended through a piece of angle iron 17 attached to the bottom of the tractor housing 14. Thus the rear end of the frame is mounted to the tractor by means of a single bolt. It will be understood that while this mounting is sufficient to hold the frame rigidly, the forward end of the frame may be raised or lowered in a pivoting action so that the depth of the plows may be set as desired.

Positioned at substantially the midpoint of the length of the side arm 10 I have provided a tool post 18 consisting also in a length of square metal and having one end welded to the side arm 10 in the manner shown. The tool post 18 is further provided with suitable bracing or gussets 19. This tool post is positioned at a substantial right angle to the side arm 10.

On the opposite side of the arm 10 and forward of the tool post 18, I have provided a hanger member 20 made by bending a piece of metal in the manner shown in the drawing and welding one end to the side arm 10. The low end of this hanger member is provided with a hole 21 adapted to receive an anchoring pin on the plow that will be described later in this specification.

At the forwardmost end of the side arm 10, I have provided an upright 22 having a pivotally mounted cap 23 on its upper end. To this cap I have welded a link bar 24 having a pivotally mounted stem 25 affixed to its forward end. The stem 25 is arranged for insertion into a tubular socket member 26 having its lower end prepared for bolting the same to the front axle of tractor. It is to be noted that the lower end of the socket member 26 is sufficiently flexible or may be provided with pivot means to pivot from the position shown by continuous lines in Fig. 4 to the position shown by broken lines therein.

Figure 4:
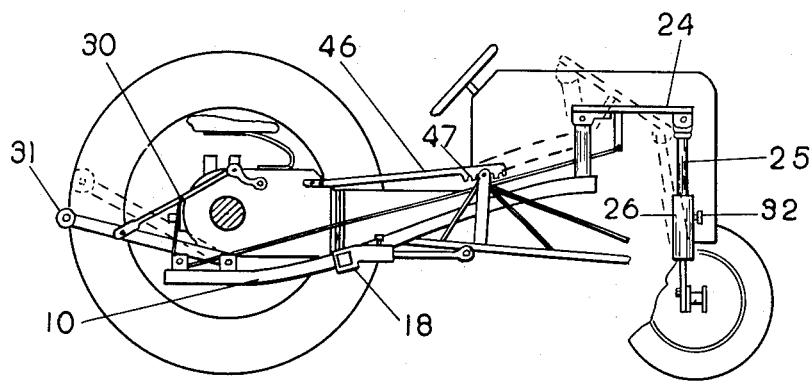
Fig. 4 is a broken view of the plow and main frame as attached to a tractor.

On the upper link bar 24 I have provided an anchor arm 27 depending downwardly therefrom and having one end of a length of cable 28 attached thereto. This cable is extended rearwardly along the side arm 10 and passes under a pulley 29 mounted at the rear end of the side arm, and finally connects to one of the lifting arms 30 as shown in Fig. 4. Thus, when the hydraulic lift mechanism of the tractor is made to raise its lift arms 30 and 31, the frame is made not only to pivot about its mounting pins at the rear of the tractor, but also to jack-knife in the manner shown in Fig. 4 to raise and lower the tool post 18 to various heights. It will be noted also that the forward stem 25 may be raised or lowered to various heights within its socket member 26 for additional adjustment and held in such adjustment by means of a set screw 32.

Figure 3:
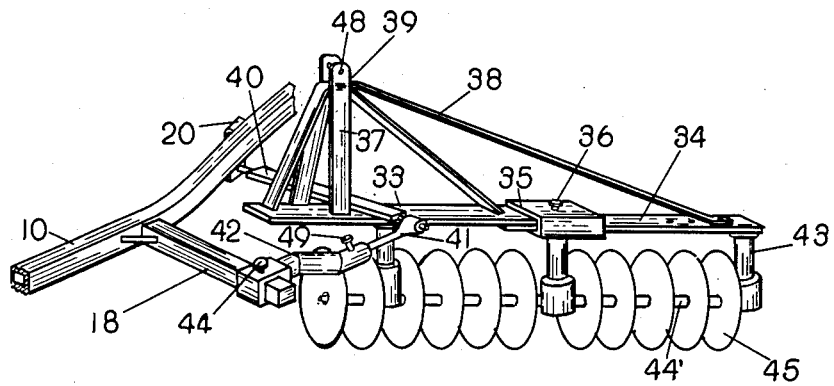
Fig. 3 is a broken, isometric view showing the mode of attaching the orchard plow to the main frame.

In Fig. 3 a portion of the frame is shown with my invention in an orchard plow attached thereto. The plow consists of a pair of plates 33 and 34 with opposite ends overlapped as shown and slidably inserted into an adjusting box 35. The plates are adjusted for a given total length by the amount of overlap through the box and are held together by means of a bolt 36.

At the inner end of the plate 33 I have formed a network of braces 37 adapted to assist the plates 33 and 34 in resisting the thrusts from the plows. One of these braces 38 is directed toward the outer end of the outer plate 34 where the end thereof is removably connected so that the proper adjustment in length can be made. The upper ends of two of the braces 37 are spaced to form a yoke 39 and provided with a removable pin 48.

Lying across the top of the rear plate 33 and welded to the same is a flat cross member 40 having a pivot pin at each of its ends. The inner pivot pin is swivelly mounted in the hole 21 of the hanger member 20 and the outer pin is inserted into a prepared hole in an adjusting stem 41. The end of this adjusting stem 41 is slidably mounted in one end of a tubular socket member 42 which has its opposite end adapted for mounting upon the tool post 18. It will be noted that the socket member 42 may be moved in and out at varying distances from the side arm 10 and locked in such position by means of the set screw 44.

Depending from the underside of the plates 33 and 34 are standards 43 supporting a conventional disc shaft 44' upon which any number of discs 45 are mounted. In the present instance the plane of the mounted discs is at right angles to their supporting shafts 44' and consequently at right angles to the upper extended plates 33 and 34.

From the above description of the plow it is readily apparent that the plow may be quickly and easily assembled to the main frame without the necessity of special tools or equipment.

The plow and frame are provided with several important adjusting features which are highly advantageous when the device is being used to disc the ground around trees.

One of these adjusting features is the ability to tilt the discs in a vertical plane so as to make the bottoms of the discs lie evenly with the ground level. This is done by rotating the entire plow in the desired direction around the pivot mounting pins positioned at each end of the cross member 40. In Fig. 4 it will be noted that I have provided an upper brace 46 having its inner end pivotally mounted to some point on the body of the tractor and its outer end provided with several notches 47 engageable with a pin 48 placed through the yoke 39 of the plow. Thus, when the plow frame is rotated upon its pivot mounting pins, one of the notches 47 in the upper brace 46 is selected and placed over the pin 48 so as to maintain the plow in its newly adjusted position. It will be remembered that after the plows have been set to the desired level they may be quickly and easily raised or lowered to various plowing depths by raising and lowering the main frame as described above.

Figure 5:
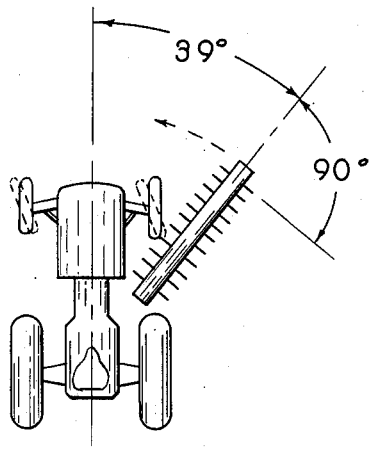
Fig. 5 is a diagrammatical plan view showing the angular relationships of the plow with respect to the longitudinal axis of the tractor.

Another highly important adjustment is found in the ability to set the plows at various degrees of angularity with respect to the longitudinal axis of the tractor as shown in Fig. 5 of the drawing. This angular adjustment is made by moving the adjusting stem 41 in or out of its rigidly held socket member 42 and securing such adjustment by means of a pin or set screw 49.

A study of the prior art has shown that considerable effort has been put forth to provide a plow of the present type which could be mounted and operated at the side of the tractor, yet each has failed in that the side thrust created by the plow has been sufficient to pull the entire tractor to one side and only with considerable effort is an operator able to maintain a true course with the tractor. Even then the operator must exercise care in setting the depth of his plows lest a sudden thrust pull him off course.

In the present invention I have been able to overcome all side thrusts by the unique manner of concentrating the plow load at the rear of the tractor and distributing such load between the two spaced mounting pins of the frame. By reference to Fig. 5 it can be seen that while the general alignment of the discs is placed at a considerable angle from the longitudinal axis of the tractor, the discs are placed 90 degrees from this alignment. Thus, when the tractor is moved forwardly in plowing, the thrust, acting against the discs, has a tendency to turn them to the left, or counterclockwise, while the forward movement causes a general clockwise thrust. By adjusting the angular setting of the discs according to the density of the ground being plowed, these loads can be substantially balanced so that little or no thrust is put on the tractor to pull it to one side or attempt to turn it in a sudden arcuate movement.

In actual tests of the device in sandy loam soil, it has been found that the setting of the discs operates best at an angle from the tractor just under 45 degrees. Other adjustments, however, can be made as described, and according to the type soil in which the device is being used.

In Fig. 5, it can also be seen that the plows or discs may be extended to any desired length in their angular setting, even well beyond the front end of the tractor, without affecting the distribution or balance of the thrust loads as described above. By extending the plows beyond the front end of the tractor, an operator is able to reach close to the tree and to move around quickly. Since the turning radius is greater than that of the tractor itself, the speed of movement in turning is also increased, thus allowing an operator to make sharp turns when necessary by only a slight movement of the tractor's steering wheel.

One theory being advanced in plowing is that the grass and weeds cut should be left in the field and allowed to disintegrate or rot and form a mulch which will eventually add to the fertilization of the crops. If a turning plow is used in an effort to follow this theory, sufficient dirt is turned with the grass to permit continued growth and the grass is not killed. With the present invention, the staggered discs not only cut a wide swath at a single passing, but also sever the grass from the roots just below the ground surface and roll it free of any soil attempting to mat it together. In a few hours time, the grass is wilted and may be allowed to remain in the field as a fertilizer.

The plow and its frame are simple in construction as shown by the drawing and description. The plow may be removed from the general frame by lowering the same to the ground surface and removing the adjusting stem 41 from its socket member 42. Other tools and attachments such as a single plow or terracer, a harrow, a planter or the like may be attached to the tool post 18 in the same manner as the orchard plow; or, the frame may be left mounted to the tractor without any attachments at all. As before stated, the frame in no way prohibits the use of the rear lift arms of the tractor for other purposes nor makes the normal use of the tractor cumbersome. If it is desired to remove the frame from the tractor, it is only necessary to remove the front stem 25 from its mounting in the socket member 26 and also remove the single bolt 16 holding the rear cross bar 11 to the rear axle housing 14.

The general framework and the manner of bracing are given as illustrations only and it is to be understood that the several braces and manner of mounting them could be changed without departing from the scope of the invention as defined by the following claim.

I claim:

An attachment for a tractor having front and rear axles and a hydraulically operated lift arm adjacent the rear axle, said attachment comprising a side arm arranged to extend along one side of the tractor, a crossbar rigidly attached to the rear end of the side arm and arranged for pivotal connection to the rear axle housing of the tractor so as to swing in a vertical plane, a tool post rigidly attached to the side arm and extending outwardly therefrom, a tool hanger member carried by the side arm forwardly of the tool post, an upright member fixed to the forward end of the side arm, a link bar pivoted at one end to the upright member and at its other end to a depending stem, a socket member receiving the lower end of the stem and constructed and arranged for flexible connection to the tractor front axle, a pulley mounted on the rear end of the side arm, and cable means connected at one end to the link bar and extending around the pulley for connection at its other end to the lift arm, whereby operation of the lift arm will serve to raise and lower the side arm.

References Cited in the file of this patent
UNITED STATES PATENTS

| | | |
|---|---|---|
| 1,456,817 | Morton | May 29, 1923 |
| 1,492,791 | Goldsmith et al. | May 6, 1924 |
| 1,731,925 | Hester | Oct. 15, 1929 |
| 2,041,832 | Hester | May 26, 1936 |
| 2,185,634 | Jacobs et al. | Jan. 2, 1940 |
| 2,295,898 | Hollis | Sept. 15, 1942 |
| 2,307,655 | Arps | Jan. 5, 1943 |
| 2,437,581 | Wray | Mar. 9, 1948 |
| 2,528,352 | Faucett | Oct. 31, 1950 |